(No Model.)
A. C. ESTABROOK.
ASSEMBLING AND TRANSFERRING DEVICE FOR USE IN MOLDING COVERINGS UPON HEADS OF TACKS.
No. 587,117. Patented July 27, 1897.
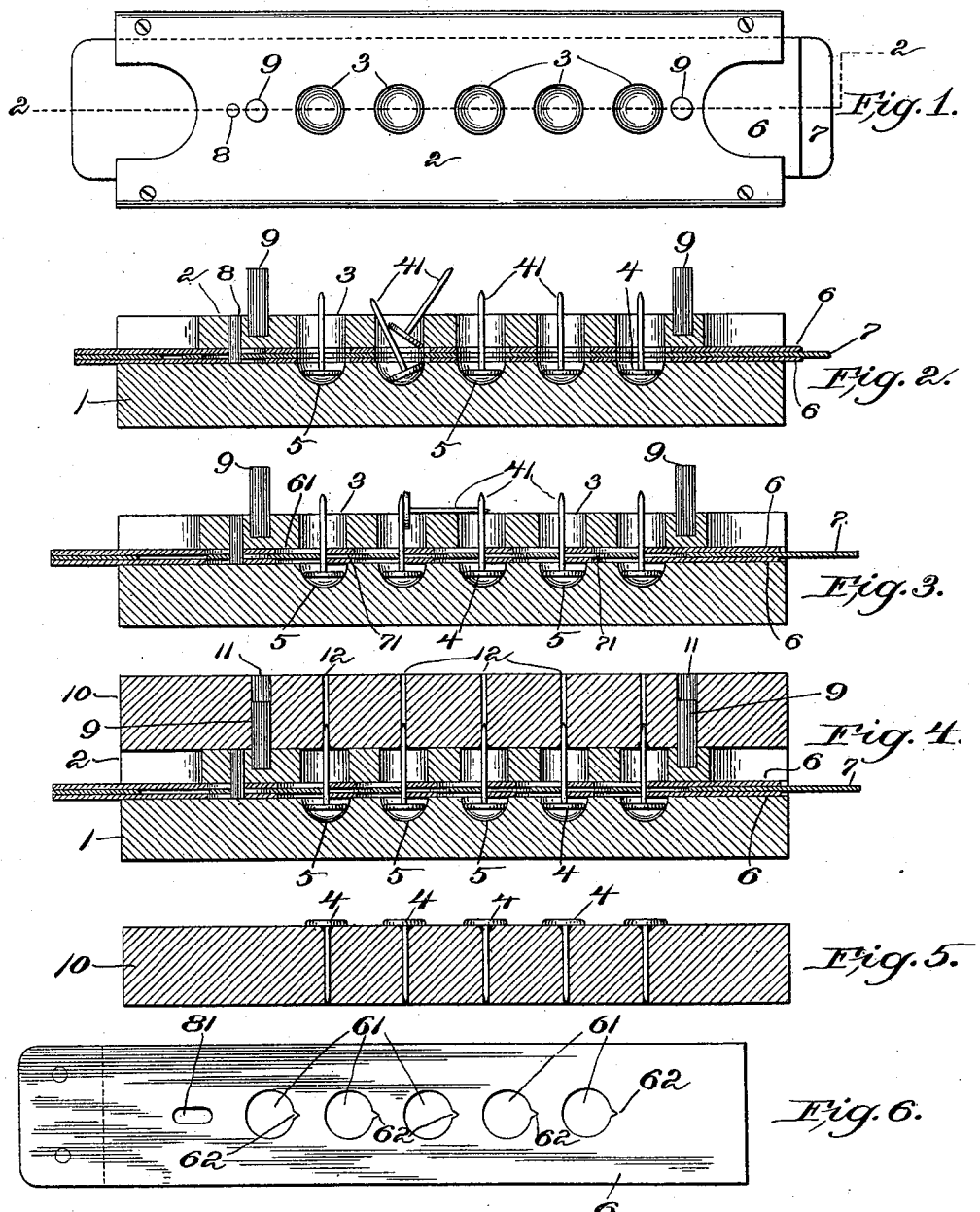
Witnesses:
Arthur T. Randall
Harry M. Keys
Inventor:
Alanson C. Estabrook
by Macleod Calver & Randall
his Attorneys

UNITED STATES PATENT OFFICE.

ALANSON C. ESTABROOK, OF NORTHAMPTON, MASSACHUSETTS.

ASSEMBLING AND TRANSFERRING DEVICE FOR USE IN MOLDING COVERINGS UPON HEADS OF TACKS.

SPECIFICATION forming part of Letters Patent No. 587,117, dated July 27, 1897.

Application filed November 27, 1896. Serial No. 613,527. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Assembling and Transferring Devices for Use in Molding Coverings Upon the Heads of Tacks, of which the following is a specification, reference being had therein to the accompanying drawings.

The invention relates to the devices which are employed in the process of applying ornamental coverings of plastic material, such as celluloid, to the heads of furniture tacks or nails and the like articles. The said coverings are secured to the heads of the tacks by means of dies or molds to which are applied the tacks which are to be covered and also the requisite plastic material, after which the dies or molds are closed together and subjected to compression to cause the plastic material to cover and adhere to the heads of the tacks and also to give the requisite shape to the coverings. In order that the molding operations may be effected economically, it is necessary that a considerable number of the tacks should be acted upon at one time. This necessitates constructing the molds in such manner as to fit them to receive a large number of tacks at the same time and also a quantity of plastic material sufficient to cover all the tacks that thus are received by the molds.

It is the object of my present invention to dispense with the necessity for placing the tacks singly by hand in the molds and to render it feasible to deal readily and conveniently with large numbers of tacks. To this end I provide a simple and practical device whereby to assemble quickly and conveniently a sufficient number of tacks or the like to fill the dies or molds, and also whereby to transfer them *en masse* to the dies or molds, placing them in the latter in the desired position and in readiness for the application of the covering material thereto.

The invention will be described first with reference to the accompanying drawings, in which latter is represented the best embodiment thereof which I have yet contrived, and afterward the distinguishing characteristics thereof will be more particularly pointed out, and distinctly defined in the claims at the close of this specification.

Figure 1 of the drawings is a plan view of the said embodiment of the invention. Fig. 2 is a view in longitudinal section on the line 2 2 of Fig. 1, showing the application of a number of tacks thereto, the parts being in the positions which they are caused to assume in order to provide for the assembling of the tacks and only a small number of tacks being shown for the sake of clearness. Fig. 3 is a view in section on the same line, but showing the parts in the positions which they are caused to assume in order to set and hold the tacks in upright position, whereby to prepare them for transfer to that one of the mold-plates by which the tacks are received preliminary to performing the molding operation. Fig. 4 is a view in similar section, showing the surplus tacks removed and also indicating the application of the tacks to the mold-plate aforesaid. Fig. 5 is a view showing in longitudinal section the mold-plate of Fig. 4 after the tacks have been applied thereto. Fig. 6 is a plan view of part of the plates by means of which the tacks are caused to set or stand up in centered position.

In the drawings I have shown the devices as constructed to receive a single row of tacks, the latter being five in number. It is to be understood, however, that in practice the devices will be constructed to receive a considerable number of rows of tacks, and a greater number of tacks will be provided for in each row.

At 1 is the base-plate of the device, and at 2 the top plate thereof. Through the top plate is formed a series of holes 3 3, each a little larger in diameter than the head 4 of a tack, so as to permit the said head to pass freely into and out of the same.

5 5 are depressions in the upper surface of the base-plate 1, registering with the holes 3 3 in the top plate 2, each depression being sufficiently large to accommodate the head of a tack. The base-plate 1 and top plate 2 are secured together in suitable manner, they being separated by a space which receives a set of sliding perforated plates 6 and 7. By preference I employ two plates 6, secured together, and a single intermediate plate 7. These plates 6 and 7 have holes 61 and 71 therethrough corresponding in diameter with the holes 3 3 in the top plate 2, and by pressing the said plates 6 and 7 endwise in opposite directions to the extent which is determined by the stop 8, applied to the top plate and projecting into slots 81 in the plates 6 and 7, the said holes 61 and 71 may be made to register with the holes 3 3 in the top plate 2 and the depressions 5 5 in the base-plate, as shown clearly in Fig. 2. Plates 6 and 7 being disposed as shown in Fig. 2, the devices are in readiness to have the tacks applied thereto, which may be effected by pouring a quantity of the tacks upon the top plate 2. This having been done, it will be sufficient to either shake the device or brush the tacks across the face of the top plate, which will cause the tacks to drop into the open holes. This shaking or brushing operation will have more or less tendency to dislodge such tacks as are not head downward in the holes. Each hole receives a tack, but only one tack can get into a hole, so as to go down to the bottom of the hole. Should a second tack get into a hole, it will lodge part way down. Then the plates 6 and 7 are drawn endwise in opposite directions into the position represented in Figs. 3 and 4, which will cause the edges of the holes therein to press on opposite sides of the stems 41 41 of the tacks, as in Figs. 3 and 4, causing the said stems to stand upright and occupy positions centrally of the holes 3 3 in the top plate 2. The surplus tacks which were dropped into the holes will be displaced by the operation of closing the plates 6 and 7 and may be caused to drop off by turning the device over. In order to facilitate the centering of the said stems, I preferably form notches 62 in the edges of the openings 61, which notches receive the stems 41 41 when the plates 6 and 7 are closed, as in Figs. 3 and 4. After the closing of the said plates the surplus tacks will be disposed of by turning the device over, as aforesaid, the few which are point downward will be set in proper position by hand, the said plates being opened again, if necessary, to permit of this being performed. The holes in the assembling device being filled with tacks and the stems thereof being held erect and centrally of the holes in the top plate by means of the plates 6 and 7, all is in readiness for the transfer to a mold-plate.

9 9 are dowels or steady-pins projecting upwardly from the top plate.

At 10 is one of the mold-plates which are employed in applying the coverings of plastic material. The said mold-plate 10 may be of any suitable character or construction, it having holes 11 11 to receive the said dowels or steady-pins and being represented as simply having holes 12 12 to receive the stems of the tacks. The said mold-plate is applied to the assembling device, as in Fig. 4, the holes 12 12 thereof registering with the projecting points of the tacks in the assembling device, and the said points in consequence entering the said holes 12 12, as indicated in Fig. 4. The parts being now inverted so as to bring the mold-plate underneath and the plates 6 and 7 being pressed inwardly so as to open the holes thereof, the tacks which are freed by such opening are left in the holes 12 12 of the mold-plate, as in Fig. 5, when the assembling device is lifted off.

As will be obvious, the essential features of the invention are the overlapping movable plates 6 and 7, having the holes therethrough.

I claim as my invention—

1. An assembling device for tacks and the like articles, provided with a series of oppositely-movable overlapping plates 6 and 7 having openings or holes therethrough to permit passage of the tacks, substantially as described, and means to retain the tacks in position to enable their stems to be acted upon by the said plates and centered thereby when the plates are moved in opposite directions to close the said openings or holes, substantially as and for the purposes set forth.

2. An assembling device having receptacles for a series of tacks, and having a series of overlapping movable plates 6 and 7 formed with holes or openings therethrough as described, whereby when the plates are moved in opposite directions to close the said holes or openings the stems of the tacks will be centered, substantially as described.

3. The combination with a mold-plate constructed to receive the stems of a series of tacks or the like, and to assist in molding coverings of plastic material or the like on the heads thereof, of an assembling and transferring device for applying the tacks or other articles to the said mold-plate, the said device having a series of receptacles for the tacks, and overlapping movable plates 6 and 7 having the holes 61, 71, therethrough, as described, whereby when the said plates are moved in opposite directions to close the said holes the stems of the tacks will be set up and centered, and whereby after such stems have been introduced into the mold-plate the reverse movements of the plates will release the tacks and enable them to be left in the mold-plate, substantially as described.

4. The combination with the base-plate having the depressions 5, 5, and the top plate 2 having holes 3, 3, of the intermediate overlapping movable plates 6, 7, having holes 61 and 71, substantially as and for the purposes set forth.

In testimony whereof I affix my signature in presence of two witnesses.

ALANSON C. ESTABROOK.

Witnesses:
GEORGE H. RAY,
HOMER C. BLISS.